April 29, 1958     E. KUSTUSCH     2,832,390
SCREW LOCKING DEFORMABLE DISK HAVING
WORKPIECE ENGAGING FINGERS
Filed Feb. 11, 1955

INVENTOR.
Edmund Kustusch
BY
Louis Chayka
ATTORNEY

United States Patent Office 2,832,390
Patented Apr. 29, 1958

2,832,390

SCREW LOCKING DEFORMABLE DISK HAVING WORKPIECE ENGAGING FINGERS

Edmund Kustusch, Detroit, Mich., assignor to Paul W. Kustusch, Detroit, Mich.

Application February 11, 1955, Serial No. 487,563

2 Claims. (Cl. 151—5)

The object of the improvement is to provide a device of a very simple structure, which device may be applied for engagement with the head of a screw and the wall of the bore or socket in which the screw is located in such a manner that said device will prevent loosening or dislocation of the screw from the bore in which it is disposed, but will not prevent easy removal of the device when this should be desired.

The specific structure of the device and the bore into which the screw is to fit, as well as the advantages of employing said device, will be fully understood in the light of the following specification in which.

Similar numerals refer to similar parts throughout the several views.

Figure 1:
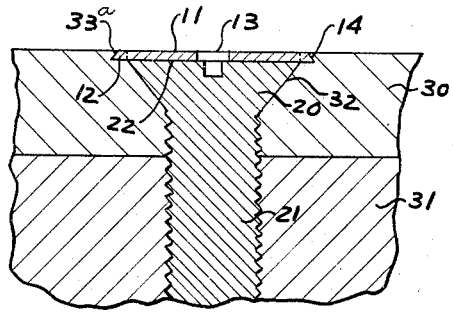
Fig. 1 is a partly sectional and partly elevational view of a screw shown in fragment but including a head and a part of its shank, the view illustrating the screw in its operative position wherein it joins two parallel plates.
Figure 2:
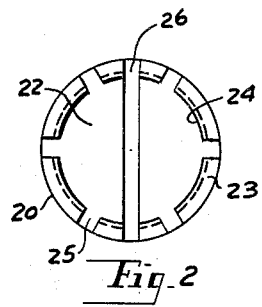
Fig. 2 is a top elevational view of the head of the screw.

The screw locking device comprises a metal disk generally marked 10, the disk including a circular mid-portion 11 and a plurality of integrally-formed tangs 12 of uniform length and width, the mid-portion being provided with a circular opening 13 which is preferably threaded for application of a tool to which I shall refer in the course of this specification.

An important feature of the structure of the disk is the slanting edges 14 of the end portions of the tangs along the periphery of the disk as a whole and a similarly slanting edge 15 of the mid-portion 11 of the disk. Specifically, in both cases, the respective edges slant downwardly from the upper edge of the disk towards the lower surface thereof, but away from the center of the disk.

Figure 5:
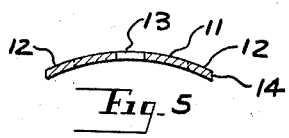
Fig. 5 is a sectional view thereof on line 6—6 of Fig. 4.
Figure 6:
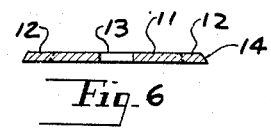
Fig. 6 is a side elevational view of the device in a flattened form.
Figure 7:
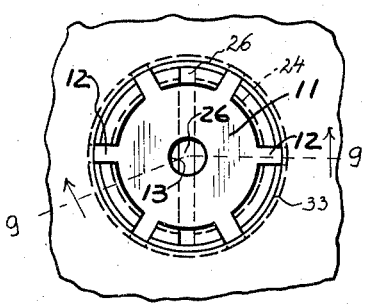
Fig. 7 is an elevational view of the device as applied to the head of the screw which has been fully threaded into its place.

Normally, the disk has the shape of a dome or a concavo-convex shell formed to a spherical radius, as shown in Fig. 5, but when applied to the head of a screw it is to be flattened, as will be presently described. When the disk is in such a flattened position, the angle of the slant with respect to the under surface of the disk will be approximately 60 degrees, as shown in Fig. 6. It must be stated here that the angle is only suggestive and that any other suitable angle may be used for the purpose.

Figure 3:
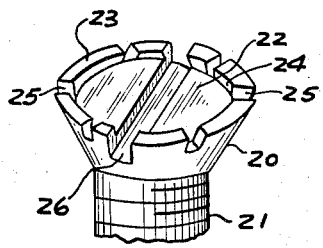
Fig. 3 is a perspective view of the head of the screw.
Figure 4:
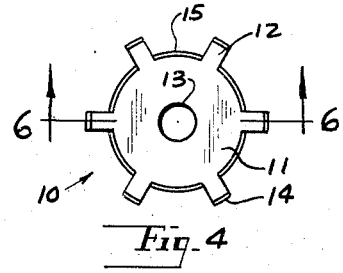
Fig. 4 is a top elevational view of the device.

I shall now refer to the screw to which the device is to be applied. A screw of this type, best shown in Fig. 3, includes a head 20 and a threaded shank 21. The upper surface of the head, which is flat, is provided with a circular axial recess 22, the recess being large enough to leave only a marginal crown 23 rising above the bottom surface of said recess. The crown is undercut along its inner surface 24 so that said surface bordering said recess 22 slants downwardly away from the center of said recess, the angle of the slant corresponding to the angle of the slant of the edge 15 of the midportion of the disk.

The marginal crown 23 is provided with a plurality of radial slots 25 open from the top, the slots being wide enough and deep enough to receive therein individual tangs 12. To conclude the description of the screw, I wish to add that it is provided with a diametrical slot 26 for application of a screw driver.

Fig. 1 shows the screw as it is employed for the purpose of joining two metal plates, an upper one 30 and a lower one 31. In order that the disk 10 may be used to prevent the dislocation of the screw once it has been threaded into the holes into which it is to fit, the upper plate 30 is provided with a circular aperture 33 the wall of which, 33a, slants downwardly and outwardly, and with a funnel-like socket 32 below said aperture for reception of the head 20 of the screw. The angle of the slant of the wall corresponds to the angle of the slant 14 of the tangs 12. It will be noted that the top of the crown 23 of the screw is flush with the top surface of plate 30.

At this point it must be stated that the diameter of the central portion 11 of the disk, in its initial dome-like form, is such that it will fit into the recess 22 in the head of the screw, while the diameter of the disk in its dome-shaped form, including the tangs, is such that the disk as a whole will fit into the aperture 33 above the socket 32 in said upper plate 30.

Assuming that the disk in its initially dome-shaped form has been placed upon the head of the screw with the tangs fitting into the slots 25 in the crown 23, the disk may be pressed downwardly against the head of the screw till it has flattened out. As a result thereof, the slanting edge 15 of the mid-portion 11 of the disk will be forced under the slanting inner face of the crown 23, while the slanting marginal portions of tangs 12 will extend into an interlocking engagement with the downwardly slanting face 33a of the aperture 33 over socket 32 in said plate 30, as shown in Fig. 1. The flattening of the disk may be brought about either by gradual pressure or by a single blow by means of a suitable tool or a machine.

Once the disk has been flattened and its edges have been interlocked with said undercut portion in the head of the screw and the face 33a in aperture 33, the disk will prevent any axial movement or loosening of the screw by any vibration or minor stresses. However, should it be desired to remove the screw, the disk, applied to the head of the screw as described above, may be easily plucked out by means of a tool which could be threaded into the threaded hole 13 in the mid-portion of the disk.

Figure 8:
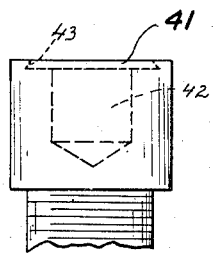
Fig. 8 is a side elevational view of a modified type of a screw to which the device may be applied.
Figure 9:
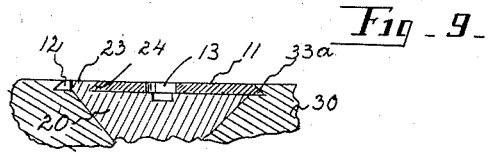
Fig. 9 is an enlarged sectional view on line 9—9 of Fig. 7.

Fig. 8 discloses a different type of a screw which instead of being provided with a diametrical slot for application of a screw driver is provided with a polysided socket 42 for application of a wrench. The head of the screw is provided with an axial recess 41 defined by a circular, downwardly-slanting face 43 in a manner analogous to that shown in the screw described above. This type of a screw is locked in place in all respects in the manner shown in Fig. 1.

After having described my improvement, what I wish to claim is as follows:

1. In combination, a member having a screw receiving aperture whose outer end is defined by an outwardly diverging wall for receiving the head of the screw, the said diverging wall at its outer end intersecting the horizontal bottom wall of a countersunk circumferential recess in the member, said recess being further defined by an edge wall inclined outwardly toward the axis of said aperture, a screw including a frusto-conical head disposed in said aperture, said head including an outwardly projecting marginal flange circumferentially interrupted by radial slots and the portions of said flange intermediate said slots having inner walls converging outwardly toward said axis, and a screw locking device comprising a metallic disc including a central circular portion and a plurality of circumferentially spaced tangs projecting radially therefrom, the said disc before application being of outwardly arch form, the edge of said circular portion intermediate said tangs being beveled for engagement with said converging walls on said flange and the outer ends of said tangs being beveled for engagement with said edge wall of said recess upon flattening of the locking device upon impact thereon and with the said tangs extending through said slots, whereby the screw is retained against rotation and consequent outward axial movement.

2. The structure according to claim 1, wherein said central circular portion of said screw locking device is provided with a central aperture whose wall is threaded for engagement therewith of a tool for removal of the locking device.

References Cited in the file of this patent

UNITED STATES PATENTS

| | | |
|---|---|---|
| 76,201 | Kirk | Mar. 21, 1868 |
| 2,653,728 | Manning et al. | Sept. 29, 1953 |

FOREIGN PATENTS

| | | |
|---|---|---|
| 22,667 of 1902 | Great Britain | Dec. 3, 1902 |
| 406,153 | Italy | Oct. 21, 1943 |